United States Patent [19]
Biber

[11] Patent Number: 6,036,143
[45] Date of Patent: Mar. 14, 2000

[54] SOLAR ARRAY-MOUNTED STATIONKEEPING AND MANEUVERING THRUSTERS

[75] Inventor: Klaus W. Biber, Rancho Palos Verdes, Calif.

[73] Assignee: TRW Inc., Redondo Beach, Calif.

[21] Appl. No.: 08/993,028

[22] Filed: Dec. 18, 1997

[51] Int. Cl.[7] .................................................. B64G 1/26
[52] U.S. Cl. .......................................... 244/169; 244/173
[58] Field of Search .................................. 244/169, 172; 60/203.1

[56] References Cited

U.S. PATENT DOCUMENTS

| | | | |
|---|---|---|---|
| 3,300,162 | 1/1967 | Maynard et al. . | |
| 3,532,299 | 10/1970 | Williamson et al. . | |
| 3,532,304 | 10/1970 | Pyptiuk | 244/172 |
| 3,662,973 | 5/1972 | Paine et al. | 244/169 |
| 4,407,469 | 10/1983 | Fox . | |
| 4,585,191 | 4/1986 | Blount . | |
| 4,825,646 | 5/1989 | Challoner et al. | 244/169 |
| 4,892,273 | 1/1990 | Fedor et al. . | |
| 5,114,101 | 5/1992 | Stern et al. . | |
| 5,211,360 | 5/1993 | Zimbelman . | |
| 5,349,532 | 9/1994 | Tilley et al. | 244/164 |
| 5,383,631 | 1/1995 | Mazzini | 244/169 |
| 5,738,308 | 4/1988 | Haag | 244/169 |
| 5,779,195 | 7/1998 | Basuthakur et al. | 244/172 |
| 5,845,880 | 12/1998 | Terosov et al. | 244/169 |

FOREIGN PATENT DOCUMENTS

| | | |
|---|---|---|
| 0861784 | 2/1998 | European Pat. Off. . |
| 14444982 | 5/1966 | France . |
| 0114100 | 4/1990 | Japan . |
| 0200599 | 8/1990 | Japan . |
| 9832657 | 7/1998 | WIPO . |

OTHER PUBLICATIONS

Space Power, Inc., and Keldysh Research Center, a Joint Venture, a brochure entitled "*Hall Effect Plasma Thrusters,*" San Jose, CA, Aug. 1997.

*Primary Examiner*—Galen L. Barefoot
*Attorney, Agent, or Firm*—Michael S. Yatsko

[57] ABSTRACT

A spacecraft includes a thruster coupled to an outward-facing portion of each solar array such that the thruster plume faces outward from the spacecraft. With the thruster located outboard of any erosion-sensitive surfaces on the spacecraft, the thruster exhaust is directed away from the spacecraft. Since canting of the thrusters is no longer required, the mounting of the thruster in the outward-facing portion of each solar array increases the effective Isp of the thruster. A thruster drive assembly is coupled to each solar array, adjacent to the thruster, for positioning the thruster such that any thruster exhaust is directed away from the spacecraft. A central supply tank is conveniently coupled to a central body portion of the spacecraft for providing a common propellant supply to each of the thrusters.

6 Claims, 4 Drawing Sheets

SOLAR ARRAY-MOUNTED STATIONKEEPING AND MANEUVERING THRUSTERS

BACKGROUND OF THE INVENTION

The present invention relates generally to spacecraft systems, and more particularly to solar array-mounted stationkeeping and maneuvering thrusters.

Thrusters are conventionally mounted on a surface of a central inboard body portion of a spacecraft, such as a satellite, and are typically canted about 45 degrees or more such that as the solar arrays on the spacecraft rotate, the exhaust streams of the thrusters do not impinge on the solar arrays. The exhaust streams of thrusters having high specific impulses (Isp) in the range of about 1600 to 2500 seconds, such as Hall Effect thrusters, electrical arc (Arc-jet) thrusters and ion engines, are capable of eroding exposed spacecraft surfaces in their path because of the high velocity of the emitted gases. Thrusters which fall into the high Isp category typically employ electrical power to enhance the energy of the exhaust stream. The erosive process of these exhaust streams can then degrade the electrical, thermal and/or optical properties of the exposed surfaces, such as the solar arrays, leading to a loss in spacecraft system performance. An example of this effect would be impingement of the exhaust streams of north-south stationkeeping thrusters on deployed solar array surfaces, a process which may lead to premature degradation of array power output capability.

To mitigate the effects of surface erosion, thrusters are generally canted by about 45 degrees or more to reduce the magnitude of the thruster plume impingement on sensitive spacecraft surfaces. Canting of the thrusters results in a decrease in the effective Isp, with the decrease being generally proportional to the cosine of the cant angle. Consequently, the spacecraft must carry larger amounts of propellant for stationkeeping and/or maneuvering. Generally, about 30 to 40 percent more propellant must be carried to compensate for the thrust which is typically lost due to canting. The weight availability for spacecraft payloads is decreased as a result. The loss in effective thruster performance adversely affects various factors, including mission life, payload revenue production and/or performance capability and launch vehicle costs.

What is needed therefore is an apparatus for directing thruster exhaust away from the spacecraft, which, in addition to reducing the erosive effects of thruster exhaust, delivers an increase in the effective Isp of the thruster.

SUMMARY OF THE INVENTION

The preceding and other shortcomings of the prior art are addressed and overcome by the present invention which provides, in a first aspect, a spacecraft having a body portion, including at least one member extending from the body portion of the spacecraft in a first direction away from the body portion and adapted to be exposed to solar radiation, an orbit control device for applying thrusts to the spacecraft, wherein the orbit control device is coupled to an outward-facing portion of the member such that exhaust from the orbit control device is directed away from said spacecraft, a drive device coupled to the orbit control device for positioning the orbit control device and a supply device for providing propellant to the orbit control device.

In another aspect, the present invention provides a satellite having a body portion, including a first solar array extending from the body portion of the satellite in a first direction away from the body portion, a second solar array extending from the body portion of the satellite in a second direction away from the body portion, a first thruster coupled to an outward-facing portion of the first solar array such that exhaust from the first thruster is directed away from the satellite, a second thruster coupled to an outward-facing portion of the second solar array such that exhaust from the second thruster is directed away from the satellite, a drive device for positioning the first and second thrusters and a supply device for providing propellant to the first and second thrusters.

The foregoing and additional features and advantages of this invention will become apparent from the detailed description and accompanying drawing figures below. In the figures and the written description, numerals indicate the various features of the invention, like numerals referring to like features throughout both the drawing figures and the written description.

DETAILED DESCRIPTION OF THE PREFERRED EMBODIMENTS

Figure 1:
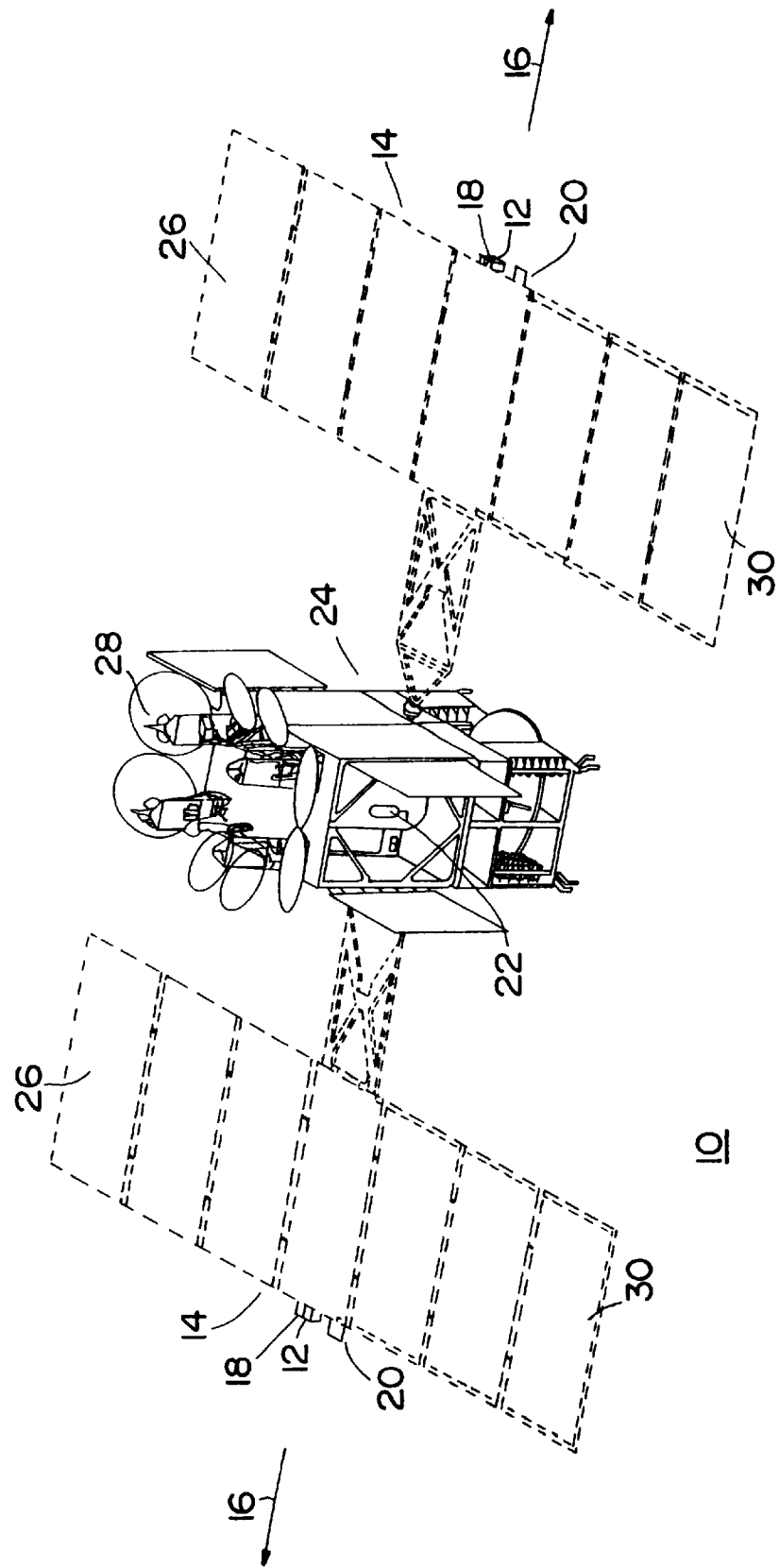
FIG. 1 is a perspective view of a spacecraft in a deployed configuration including a thruster coupled to an outward-facing portion of each solar array in accordance with a preferred embodiment of the present invention.

Referring to FIG. 1, a spacecraft 10 in a deployed configuration including solar array-mounted stationkeeping and maneuvering thrusters 12 is illustrated. In accordance with the present invention, the spacecraft 10 includes a thruster 12 coupled to an outward-facing portion 18 of each solar array 14 such that the thruster plume faces outward from the spacecraft 10, as indicated by, for example, arrow 16. With the thruster 12 located outboard of any erosion-sensitive surfaces on the spacecraft 10, the thruster exhaust is directed away from the spacecraft 10. Since canting of the thrusters is no longer required, the mounting of the thruster 12 in the outward-facing portion 18 of each solar array 14 increases the effective Isp of the thruster 12. A thruster drive assembly 20 is coupled to each solar array 14, adjacent to each thruster 12, for positioning the thruster such that any thruster exhaust is directed away from the spacecraft 10. A central supply tank 22 is conveniently coupled to a central body portion of the spacecraft 10 for providing a common propellant supply to each of the thrusters 12. Although the present invention is preferably utilized to mount high energy thrusters 12 having an Isp in the range of about 1600 to 2500 seconds, such as Hall Effect thrusters, Arc-jet thrusters and ion engines, the present invention may be utilized to mount medium and low energy thrusters, such as hydrazine thrusters (having an Isp of about 220), as well.

Referring to FIG. 1, the spacecraft 10 includes a central inboard portion 24, solar arrays 14, thruster drive assemblies 20, thrusters 12 and propellant supply tank 22. Although the spacecraft 10 is shown illustrated with various antennas 28 which are typically utilized for transmission and reception, the present invention is not dependent on the existence or operation of such antennas 28. As is illustrated in FIG. 1, each solar array 14 includes multiple panels 26. The thruster is preferably coupled such that it is centrally disposed among the panels 26 in the solar array 14. In particular, the thruster is mounted to the mid-point along the array of panels 26.

Although the present invention is illustrated utilizing a single thruster 12 mounted to the outward-facing portion 18 of each solar array 14 on the spacecraft 10, the present invention is not limited to such a configuration and two or more thrusters 12 may be used as long as the plume from each thruster 12 is directed generally outwards from the spacecraft 10. For example, to increase reliability, two or more thrusters 12 may be coupled to the outward-facing portion 18 of each solar array 14. Generally, when more than one pair of thrusters 12 is utilized, necessary orbit correction operations can be provided even if one thruster 12 fails.

Figure 4:
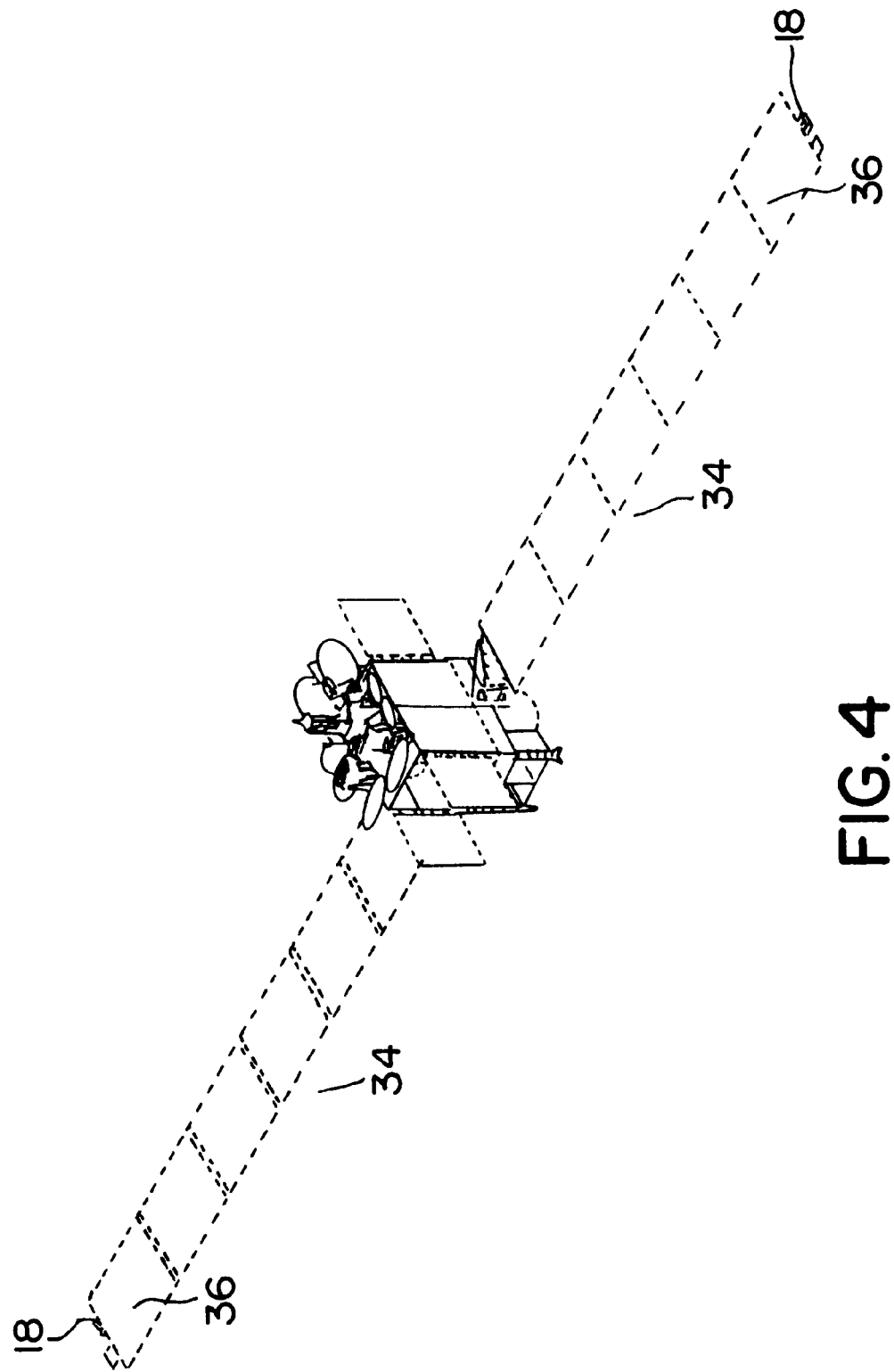
FIG. 4 is a perspective view of a spacecraft in a deployed configuration including a thruster coupled to an outward-facing portion of each solar array in accordance with yet another embodiment of the present invention.

Moreover, the present invention is not limited to multiple panel solar arrays 14 nor to the particular configuration of such panels 26. Rather, a thruster 12 can be coupled to an outward-facing portion 18 of any member extending from the spacecraft 10. For example, the thrusters 12 could be coupled with single panel solar arrays as long as they are mounted outboard. The present invention is also not limited to the particular arrangement of such panels 26 on a spacecraft 10. For example, as illustrated in FIG. 4, a solar array 34 can include panels 36 positioned in a side by side configuration. In accordance with the present invention, a thruster 12 is coupled to the outward-facing portion 18 of each solar array 34.

Figure 2A:
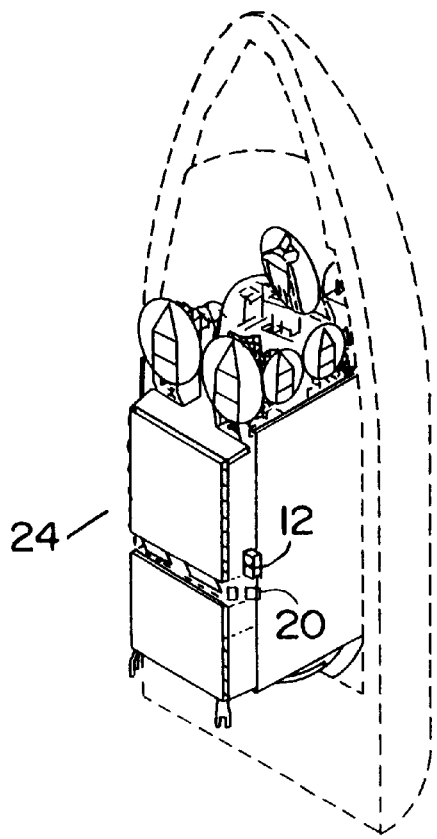
FIG. 2(a) is a perspective view of the spacecraft in a stowed configuration including the thruster coupled to the outward-facing portion of each solar array in accordance with the preferred embodiment of the present invention.
Figure 2B:
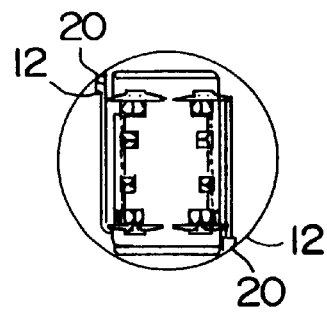
FIG. 2(b) is a top view of the spacecraft in a stowed configuration including the thruster coupled to the outward-facing portion of each solar array in accordance with the preferred embodiment of the present invention.
Figure 2C:
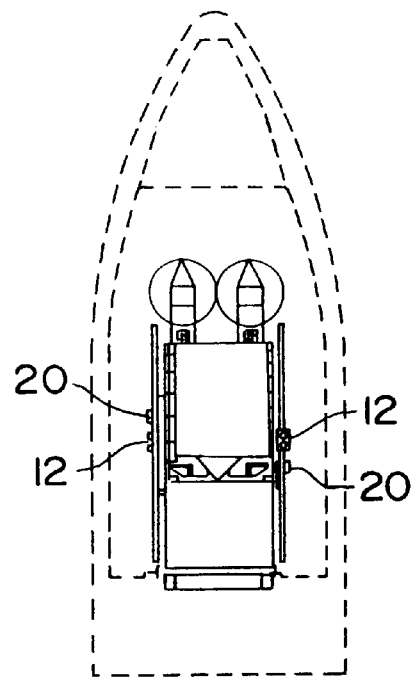
FIG. 2(c) is a side view of the spacecraft in a stowed configuration including the thruster coupled to the outward-facing portion of each solar array in accordance with the preferred embodiment of the present invention.

Referring to FIG. 1, a thruster drive assembly 20 for orienting and aligning each thruster 12 is coupled to each solar array 14, preferably adjacent to each thruster 12. The thruster drive assembly 20 is not limited to any particular design, but rather may be of any conventional or newly developed design. The thruster drive assembly 20 corrects for misalignments and orients each thruster 12 such that the exhaust from each thruster 12 is directed away from the spacecraft 10. A misalignment typically occurs when the thrust vector axis of the thrusters 12 does not correspond to the center of gravity of the spacecraft 10. Consequently, a turning moment is introduced, causing unwanted displacement of the spacecraft 10. When there is a misalignment, the thrusters 12 are steered by the thruster drive assembly 20 which duty cycles the thrusters 12 until the misalignment is corrected. In particular, one thruster 12 is allowed to fire for a longer length of time than the other thruster 12. In a typical configuration, the thruster drive assembly 20 is mechanically attached to the solar array such that it is positioned adjacent to the base of the thruster 12. The thruster drive assembly 20 is typically controlled by an onboard computer (not shown) which is responsive to one or more signals, including, but not limited to those generated by sensors (not shown) or other components or received from a ground station (not shown). As is illustrated in FIGS. 2(a)–2(c), in a stowed configuration, the panels 26 in the solar arrays 14 are conveniently folded inward. The thruster 12 and thruster drive assembly 20 are coupled to the outward-facing portion 18 of each solar array 14.

The propellant supply tank 22 is preferably coupled to the inboard central portion 24 of the spacecraft 10 for providing a common supply of propellant to both thrusters 12. The supply tank 22 may be a conventional or newly developed supply tank 22 which typically operates via a pressure regulator (not shown) and flow rate regulator systems (not shown). A rotating propellant line 30 couples the propellant from the supply tank 22 to each thruster drive assembly 20, which in turn couples the propellant to the respective thruster 12. Each thruster drive assembly 20 preferably includes a rotary seal for facilitating flow of propellant from the central supply tank 22 to the thruster 12. The propellant is preferably a xenon gas which is run at low pressure, although other conventional or newly developed propellants may be used as well.

Figure 3:
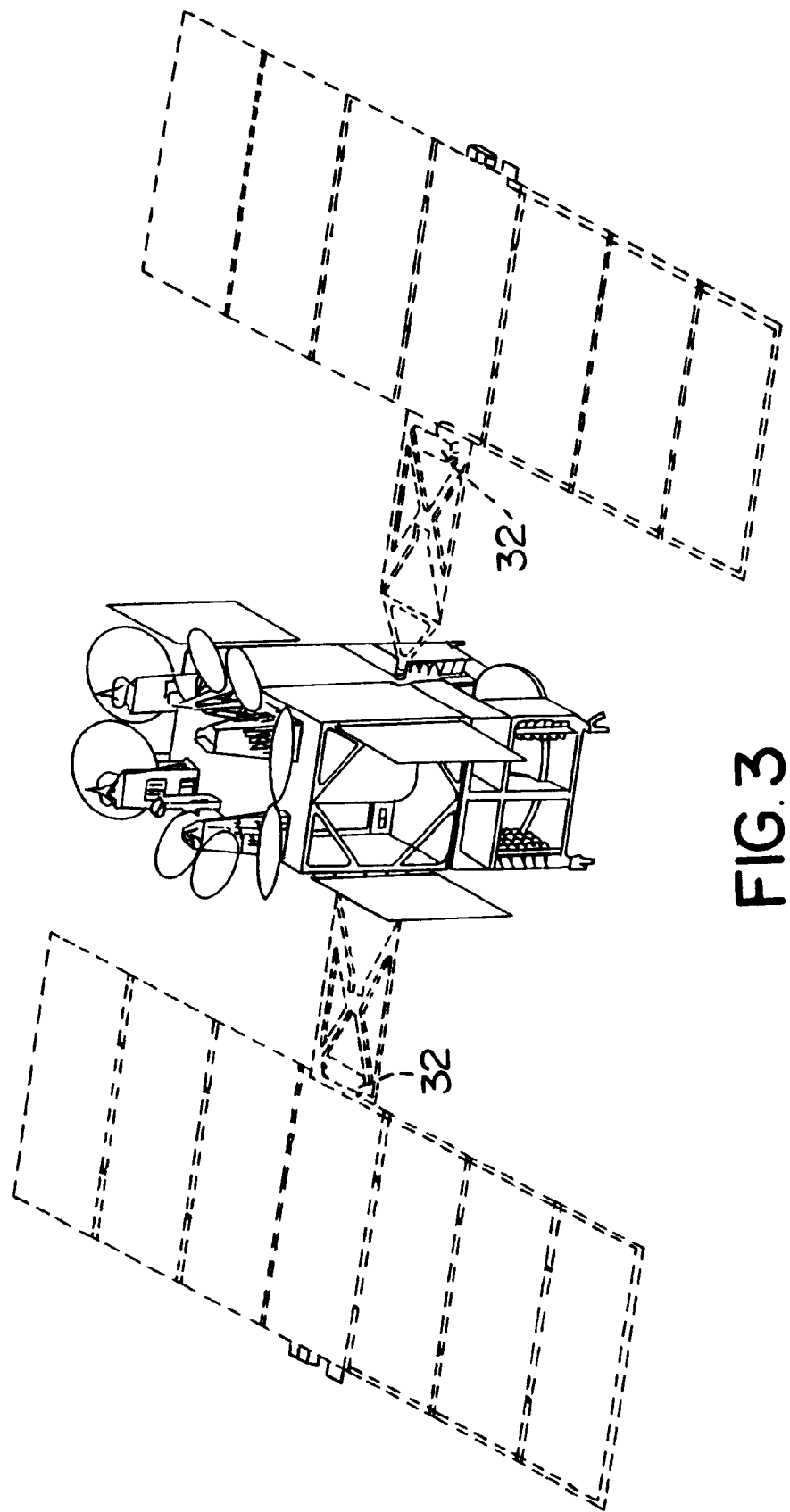
FIG. 3 is a perspective view of a spacecraft in a deployed configuration including a thruster coupled to an outward-facing portion of each solar array in accordance with another embodiment of the present invention.

Referring to FIG. 3, in accordance with an alternative embodiment of the invention, rather than being coupled to the inboard portion 24 of the spacecraft 10 as illustrated in FIG. 1 and centrally supplying propellant to the thrusters 12, a propellant supply tank 32 is coupled to each of the deployable structures, i.e. the solar arrays 14. The mounting of a dedicated propellant supply tank 32 on each solar array 14 eliminates the need for a rotating propellant line for coupling the propellant from each supply tank 32 to the thruster 12 via the drive assembly 20.

The present invention thus reduces, or eliminates, the threat of contaminant deposition on exposed electrically, thermally and/or optically sensitive spacecraft 10 surfaces. Additionally, the effective Isp of thrusters 12 used for stationkeeping and/or maneuvering is increased by eliminating canting requirements. Consequently, the present invention reduces mission propellant weight, thereby increasing available mission payload weight.

It will be appreciated by persons skilled in the art that the present invention is not limited to what has been shown and described hereinabove, nor the dimensions of sizes of the physical implementation described immediately above. The scope of invention is limited solely by the claims which follow.

What is claimed is:

1. A spacecraft, comprising:
   a body portion;
   at least one member extending from said body portion of said spacecraft in a first direction radially outwardly directed from said body portion, said member containing an end portion outwardly facing in said first direction;
   an orbit control device for applying thrusts to said spacecraft, said orbit control device containing a single thrust outlet for venting exhaust, said thrust outlet containing an axis, said orbit control device being coupled to said outward-facing end portion of said member with said axis of said thrust outlet extending in said first direction such that exhaust from said orbit control device is directed in said first direction and away from said member and said spacecraft;
   drive means coupled to said orbit control device for positioning said orbit control device in said first direction; and
   a supply device for providing propellant to said orbit control device.

2. The spacecraft claimed in claim 1, wherein said member comprises a solar array panel.

3. The spacecraft claimed in claim 2, wherein said orbit control device is coupled substantially at a mid-portion of said outward-facing end portion of said member.

4. The spacecraft claimed in claim 3, wherein said propellant comprises xenon gas.

5. A spacecraft, comprising:

a body portion;

at least one solar array panel extending from said body portion of said spacecraft in a first direction radially outwardly directed from said body portion for exposure to solar radiation, said solar array panel containing an end portion outwardly facing in said first direction;

a thruster for applying thrusts to said spacecraft, said thruster having a specific impulse in the range of about 1600 to 2500 seconds, said thruster containing a single thrust outlet having a thrust axis for venting exhaust outwardly of said body portion in the direction of said thrust axis, said thruster being coupled to said outward-facing end portion of said solar array panel substantially at a mid-portion of said outward-facing end portion with said thrust axis of said thrust outlet extending in said first direction such that exhaust from said thruster is directed in said first direction and away from said solar array panel and said spacecraft;

drive means coupled to said solar array panel and to said thruster for positioning said thruster's thrust axis in said first direction; and a propellant storage tank for providing Xenon gas propellant to said thruster.

6. The invention as defined in claim 5, wherein said thruster is one selected from the group consisting of: a Hall Effect thruster, an Arc-jet thruster, and an ion engine.

* * * * *